Figure 1A:
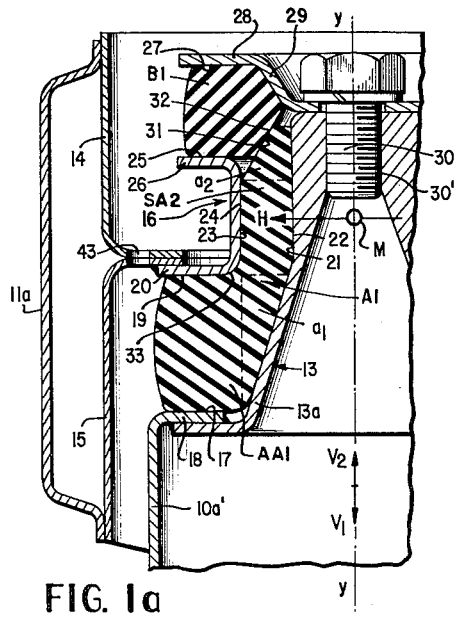

Dec. 1, 1964   K. WILFERT ETAL   3,159,391
ELASTIC BEARING CONSTRUCTION
Filed June 8, 1962

INVENTORS.
KARL WILFERT
BELA BARENYI
BY
Dicke + Craig
ATTORNEYS.

United States Patent Office 3,159,391
Patented Dec. 1, 1964

3,159,391
ELASTIC BEARING CONSTRUCTION
Karl Wilfert, Stuttgart-Degerloch, and Béla Barényi,
Stuttgart-Vaihingen, Germany, assignors to Daimler-Benz Aktiengesellschaft, Stuttgart-Untertürkheim, Germany
Filed June 8, 1962, Ser. No. 201,000
Claims priority, application Germany, June 10, 1961,
D 36,303
4 Claims. (Cl. 267—63)

The present invention relates to an annular rubber bearing which serves for connecting with each other two vehicle parts, particularly an axle bearer, preferably the front axle bearer, with the superstructure of a motor vehicle, and which is intended to absorb both the axial, particularly the vertical forces and the radial, particularly the horizontal forces, which occur between these two vehicle parts.

In actual practice, it is very difficult to proportion or adapt such rubber cushions or buffers in the proper manner as regards spring and damping characteristics simultaneously to the axially and radially-acting forces since a matching or adaptation of the rubber cushions or buffers to the forces acting in one direction will simultaneously and undesirably influence the spring characteristics in the other direction and, consequently, render virtually impossible an individual matching or adaptation.

In contrast thereto, the present invention relates to a rubber bearing which may be adapted or matched to the different forces independently of one another, and which consists essentially in the use of a rubber buffer or cushion as the sole cushion or main buffer which is composed of a sleeve-like elastic cushion or buffer part having supporting or abutment surfaces parallel to the annular axis and disposed radially opposite each other for receiving the radially-acting forces and of an annular elastic cushion or buffer part having supporting or abutment surfaces essentially perpendicular to the annular axis and disposed axially opposite each other for absorbing the axially acting forces.

By reason of the arrangement of the supporting or abutment surfaces parallel to the annular axis of the first-mentioned cushion or buffer part, particularly of a sleeve-like buffer or cushion part, this buffer part remains practically uninfluenced by the axially-directed forces while, on the other hand, the second-mentioned annular buffer or cushion part practically does not respond to the radially-directed forces. As a result thereof, it is possible for purposes of achieving a certain axial or radial spring or damping characteristic to vary the dimensions of one or the other elastic cushion or buffer part in the radial or axial direction without influencing thereby the manner of operation of the other elastic cushion or buffer part. Under certain conditions, it may also be sufficient to effect an adaptation or matching to the axial or radial forces by changing the pre-stress in the radial or axial direction, for instance, by a minor change in the dimensions of the clamped rubber parts.

Rubber bearings of similar form are known in the prior art but, in contrast to the present invention, the prior art elastic cushion or buffer parts for absorbing the radially-directed forces have conically-shaped annular surfaces as the supporting or abutment surfaces. It has been found that such rubber cushions or buffers cannot be matched independently of one another to differently-directed forces, apparently for the reason that, due to the wedging effect, the rubber is responsive not only to radial but also to axial loads so that with changes of the rubber cushion or buffer for purposes of adaptation or matching to the radial forces, the matching or adaptation to axial forces is simultaneously changed.

In a preferred embodiment of the present invention, the annular elastic cushion or buffer part for absorbing the axial forces has a greater radial width than the sleeve-shaped elastic cushion or buffer part for absorbing the radial forces, for instance, in such a manner that—with substantially the same inner diameter—the outer diameter of the former is greater than that of the last-mentioned elastic cushion or buffer part. On the one hand, this arrangement renders possible a favorable accommodation of the rubber cushion or buffer between an inner and an outer supporting or abutment element and, on the other hand, the rubber cushion or buffer may be so constructed and arranged, in a simple manner that it possesses a relatively great softness, i.e., a relatively large yieldingness in the axial, particularly vertical, direction while being effective in a relatively hard or non-yielding manner in the radial direction. By changing the diameters and/or the axial length of the individual rubber cushion or buffer parts, the rubber bearing according to the present invention may be easily adapted or matched to the respective conditions.

According to another feature of the present invention, an auxiliary rubber cushion or buffer is additionally provided for absorbing the axial forces which auxiliary cushion or buffer has generally a lesser work capacity than the elastic cushion or buffer part of the main cushion or buffer serving for absorbing the axial forces in that the last-mentioned elastic cushion or buffer part of the main cushion or buffer serves for transmitting the load of the vehicle superstructure to the axle bearer while the auxiliary rubber cushion or buffer has to absorb only the smaller oppositely-directed forces.

The buffer and buffer parts according to the present invention for absorbing axial forces are preferably arranged in a freely expandable manner at least in one radial direction, particularly radially outwardly, so that any influence on these buffer parts and cushions by radial forces is practically impossible.

Particularly advantageous is also an arrangement in which the elastic cushion or buffer part for the radial support is disposed above the elastic cushion or buffer part for the axial support and possibly as well as preferably approximately at the height of the auxiliary rubber cushion or buffer. If the rubber bearing serves for connecting a transversely extending axle bearer with the vehicle superstructure and if the axle bearer is additionally supported against the vehicle superstructure by relatively low, longitudinally-extending thrust elements, as is generally the case, then there will result the advantage that the brake forces which produce in the rubber a radially-directed force acting in the direction of the drive of the vehicle, may be absorbed with a particularly large lever arm between the lower and the upper support by reason of the relatively high location of the radial support. Such an arrangement of the elastic cushion or rubber buffers provides simultaneously therewith a particularly low, compact and therewith space-saving construction.

The rubber cushions or buffers as well as the supporting elements or abutment parts may be constructed in a very simple manner in accordance with the present invention. For example, the supporting elements or abutment parts may simply be of angular or U-shaped cross section whereby the rubber cushions or buffers are then supported at the radially- and/or axially-directed wall portions of these supporting elements or abutment parts.

Moreover, such a rubber bearing may be assembled in a simple manner, for example, by structurally combining into a unit the main elastic cushion or buffer with the radially inner supporting element or abutment part and the auxiliary elastic cushion or rubber buffer with the radially outer supporting element or abutment part, and by thereupon slipping or sliding the outer supporting part over the sleeve-like, preferably upwardly-directed elastic cushion or buffer part of the main cushion or buffer, whereupon both units may be rigidly connected with one another, particularly by bolting or screwing a plate or cover-shaped part to the inner supporting element or abutment part, which plate or cover-shaped part axially supports the auxiliary cushion or buffer.

By utilizing the buffer structure according to the present invention, the vehicle superstructure together with the elements or halves of the rubber bearing provided thereon may thus be placed from above over the axle unit together with elements or halves of the rubber bearing secured thereto, or vice versa, the axle unit may be attached to the vehicle superstructure from below.

In order to facilitate the assembly, the main buffer or an extension of the sleeve-like buffer part thereof may be provided with a conical surface so that the outer supporting part inserted over the conical surface is automatically brought into the correct position at the main rubber buffer by sliding along that conical surface.

It may also be advantageous to provide the rubber buffers or cushions, for instance, at the upper end of the sleeve-like buffer part serving for absorbing the radial forces, with a projection, for example, with an annular projection, so that the rubber buffer inserted into the outer supporting element or abutment part is retained therein in a detent-like manner and will not slip or slide out of the supporting part when the vehicle superstructure is lowered onto the axle aggregate during assembly.

The number of elements or parts necessary for the rubber bearing may be reduced to a minimum according to the present invention. One single axial screw or bolt is generally sufficient to assure the connection between the vehicle parts by means of the rubber bearing according to the present invention.

The rubber cushions or buffers and supporting elements or abutment parts are preferably provided with a circular cross section for manufacturing reasons. In order to obtain different spring stiffnesses in the radial direction, for instance, in the transverse direction of the vehicle, on the one hand, and in the longitudinal direction of the vehicle, on the other, it is also possible to utilize rubber cushions or buffers and supporting elements of different cross sections, for instance, of oval cross section. The rubber cushions or buffers may also be provided with recesses, for instance, grooves or hollow spaces, so that they obtain, in one direction, a yieldingness or stiffness different from that in the other direction, for example, in the direction perpendicular to the first-mentioned direction. For example, it becomes possible by such arrangement—as is frequently desirable—to construct the rubber bearing relatively hard in the longitudinal direction of the vehicle but relatively soft in the transverse direction of the vehicle.

Of course, in the place of rubber, any similar material, such as, for instance, synthetic rubber, may also be used. There also exists the possibility to adapt the spring characteristic of the material to the prevailing requirements by a corresponding selection of the material.

Accordingly, it is an object of the present invention to provide a rubber bearing of the type described hereinabove, capable to absorb both radially as well as axially directed forces, which is so constructed and arranged as to avoid by simple means, the shortcomings and inadequacies encountered with the prior art constructions.

It is another object of the present invention to provide a rubber bearing of the type described hereinabove in which the elastic cushion parts may be readily matched to the prevailing orthogonal forces, that may occur in a vehicle, without mutually influencing the characteristics of the cushion or buffer parts as a result of such matching.

A further object of the present invention resides in the provision of a rubber bearing of the type described hereinabove which may be matched separately and individually, without any cross-effect, to the prevailing radial as well as axial forces, which is simple and compact in construction, and which may be readily assembled.

Still another object of the present invention resides in the provision of an elastic bearing of the type described hereinabove which is intended to elastically connect with each other two vehicle parts so as to absorb forces in three dimensions in a predetermined readily ascertainable manner, and which enables greatly facilitated assembly of the vehicles.

Figure 1B:
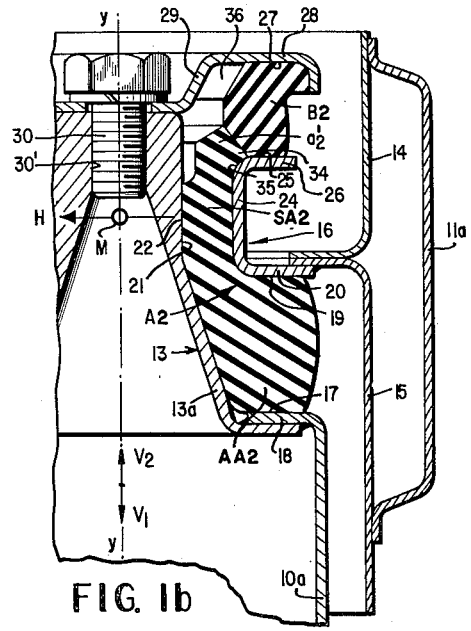
Figure 2A:
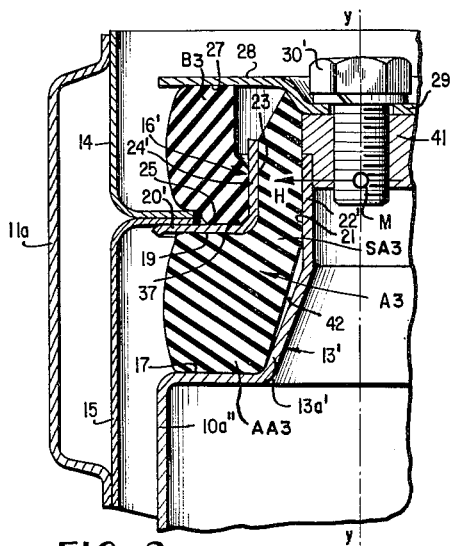
Figure 2B:
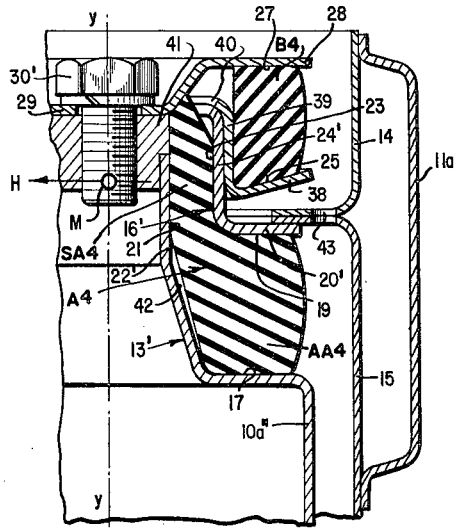
Figure 3:
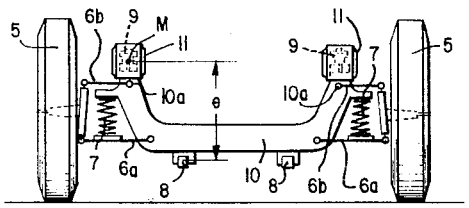

These and other objects, features and advantages of the present invention will become more obvious from the following description when taken in connection with the accompanying drawing which shows, for purposes of illustration only, several embodiments in accordance with the present invention, and wherein FIGURES 1a, 1b, 2a and 2b are partial cross sectional views of four embodiments of rubber bearing constructions in accordance with the present invention, only one side of the symmetrically arranged rubber bushing being shown in each of these views and whereby the illustrated left halves, in each of these two figures, namely in FIGURES 1a and 2a, illustrate an embodiment differing slightly from that illustrated in the shown right halves thereof, namely in FIGURES 1b and 2b, and FIGURE 3 is a schematic end view of an axle aggregate using rubber bearings in accordance with the present invention.

Referring now to the drawing wherein like reference numerals are used throughout the several views to designate corresponding parts, and more particularly to FIGURE 3, it is assumed in connection with this schematic view that the front wheels 5 together with the steering pivot pins thereof are each suspended at the axle bearer 10 by means of two guides 6a and 6b and spring-supported thereagainst by one helical spring 7 each. The axle bearer 10 is supported, on the one hand, at the vehicle superstructure 11 by relatively low longitudinal connecting or thrust rods 8, preferably by the interposition of rubber in one or both joints thereof, and, on the other, at the vehicle superstructure 11 by the relatively high rubber bearings 9 in accordance with the present invention so that brake forces at the axle bearer 10 are supported with the lever arm $e$.

Referring now to FIGURES 1a, 1b, 2a and 2b, showing the details of four different embodiments of the rubber bearing 9 of FIGURE 3 in accordance with the present invention, reference numeral 11a designates in all of these figures a box-like longitudinal frame part of the vehicle superstructure 11, and reference numeral 10a' or 10a" an upwardly-directed extension of the front axle bearer member 10.

The rubber bearings 9, of which one is provided on each side of the vehicle between the axle bearer member 10 and the vehicle superstructure 11, consist mainly of a main rubber buffer or cushion generally designated by reference character A (FIGURES 1a through 2b—reference characters A1, A2, A3 and A4, respectively) and of an auxiliary rubber buffer or cushion B (FIGURES 1a through 2b—reference characters B1, B2, B3 and B4, respectively); both of these rubber buffers or cushions A and B are constructed concentrically to the axis $y$—$y$. The main rubber buffer or cushion A includes, on the one hand, an annular elastic cushion or buffer part AA1, AA2, etc., which serves for absorbing axial or vertical forces, directed either downwardly from the vehicle superstructure 11 toward the axle bearer member 10 or upwardly from the axle bearer member 10 toward the vehicle superstructure 11, and a sleeve-like elastic cushion or buffer part SA1, SA2, etc., for absorbing the radially-directed forces effective between the vehicle superstructure 11 and the axle bearer member 10. The sleeve-like elastic cushion or buffer part SA is thereby provided with a smaller outer diameter than the annular elastic cushion or buffer part AA but passes over substantially gradually and continuously along the inner diameter thereof into the lower annularly-shaped elastic cushion or buffer part AA or into a rubber part $a_1$ (indicated schematically in FIGURE 1 only) which forms the connection between the elastic cushion or buffer part SA, axially adjoining the same and the elastic cushion or buffer part AA radially adjoining the same. The cushion parts SA1, SA2, et al. may be designated as a first cushion means; the cushion parts A1, A2 et al. may be designated as a second cushion means; and the cushion parts B1, B2 et al. may be designated as a third cushion means.

A conically-shaped inner supporting element generally designated by reference numeral 13 or 13' for the rubber cushions or buffers is rigidly connected with, for instance, welded to, the extension 10a of the axle bearer member 10, while cup-shaped insert pieces 14 and 15 are connected with, for instance, welded to, the longitudinal bearer member 11a of the vehicle superstructure 11. Welded to these cup-shaped insert pieces 14 and 15 is the outer supporting element for the rubber cushions or buffers. The outer supporting element 16 of FIGURES 1a and 1b has a substantially U-shaped cross section wherein in FIGURES 2a and 2b, the supporting element 16' has an angular cross section.

The respective elastic buffer or cushion part AA of the main buffer or cushion A is supported in one axial direction, with one end face 17 thereof, against the flanged wall portions 18 of the extension 10a of the axle bearer member 10 (FIGS. 1a and 1b) or against the inner-supporting part or abutment element 13 (FIGS. 2a and 2b), and is supported in the other axial direction, by means of the end face 19 thereof, against the flanged wall portion 20 of the outer supporting element 16 of FIGURES 1a and 1b or against the flanged portion 20' of the outer supporting element 16' of FIGURES 2a and 2b. The respective sleeve-like elastic cushion or buffer part SA is supported in the radial direction of the rubber bearing, on the one hand, by means of the cylindrical surface 21 thereof, against the outer cylindrical surface 22 or 22', of the supporting part or abutment element 13 or 13', respectively, and, with the outer cylindrical surface 23 thereof, against the cylindrical wall portions 24 or 24' of the outer supporting part or abutment element 16 or 16', respectively.

Furthermore, the auxiliary rubber cushion or buffer B1 or B2 of FIGURES 1a and 1b, respectively is clamped in the axial direction at the axial lower end face 25 thereof which abuts against the upper flanged wall portion 26 of the outer supporting part or abutment element 16, and the end face 27 thereof, which abuts against the flanged wall portion 28 of a cover-shaped part 29, intermediate the two elements consisting of supporting or abutment element 16 and cover-shaped part 29. The connection and clamping of the rubber cushions is thereby realized, by means of a screw or bolt 30 which is threaded into the bore 30' of the inner supporting part or abutment element 13 and thereby securely bolts the cover-shaped part 29 with the flange 28 thereof against the upper end face of the inner supporting part or abutment element 13. In the embodiments of FIGURES 2a and 2b, the respective cushion B3 or B4 is similarly clamped between the supporting element 16' and cover-shaped part 29 by bolt 30' which is threaded into sleeve 41 of the supporting part 13'.

In the embodiment of FIGURE 1a, the sleeve-like elastic cushion or buffer part SA1 is provided with an extension $a_2$ which abuts with the outer conical surface 31 thereof against the conical surface 32 at the auxiliary rubber cushion or buffer B1. The conical surface 31 has thereby the purpose to facilitate the assembly of the rubber cushion or buffer in that, when inserting the main rubber cushion or buffer A1 into the outer supporting part or abutment element 16 or when sliding the latter over the main rubber buffer A1, the conical surface 31 will first come into contact with the rounded-off edge 33 of the outer supporting part or abutment element 16, and the rubber cushion A1 and the supporting part or abutment element 16 are thereby mutually guided into the correct position by the wedging effect resulting therefrom.

Horizontal forces H acting in the radial direction, i.e., in the transverse or longitudinal direction of the vehicle, are absorbed practically exclusively by the elastic cushion buffer part SA1 by being transmitted at the mutually engaging surfaces 21 and 22 from the inner supporting element or abutment part 16 to the buffer part SA1 and from there, through the mutually engaging surfaces 23 and 24, to the outer supporting part or abutment element 16, or in the opposite direction.

Forces acting vertically from the vehicle superstructure 11 against the axle bearer 10 in the direction of the arrow $V_1$ are transmitted practically exclusively from the outer supporting element or abutment part 16 over the axial end faces and end walls 19 and 20, respectively, to the annular elastic cushion or buffer part AA1 and from there, over surfaces and walls 17 and 18, respectively, to the outer supporting element or abutment part 13 and therewith to the axle bearer member 10. Axial forces acting in the opposite vertical direction $V_2$ between the vehicle superstructure 11 and the axle bearer member 10 are transmitted from the outer supporting part or abutment element 16 over the surfaces and walls 25 and 26, respectively, to the auxiliary rubber cushion or buffer B1 and from there, over surfaces and walls 27 and 28, respectively, to the inner supporting element or abutment part 13 and therewith to the axle bearer member 10.

By reason of this independent transmission of the horizontal forces H, on the one hand, and of the vertical forces $V_1$ and $V_2$, respectively, on the other, the associated rubber cushion or buffer parts SA1 on the one hand, and the rubber cushion or buffer parts AA1 and B1, on the other, may be dimensioned independently of one another and be matched or adapted to the forces transmitted thereby practically without influencing the spring properties or characteristics of the rubber bearing as regards the other forces. As may be readily recognized, the elastic cushion or buffer part AA1 and the auxiliary rubber cushion or buffer B1 are able to freely expand radially outwardly so that a loading of these cushion parts by radially-directed forces is virtually impossible.

The embodiment according to FIGURE 1b distinguishes itself from that of FIGURE 1a essentially only by the provision, at the extension $a'_2$ of the cushion or buffer part SA2, of an outwardly protruding annular projection 34 which, when the main cushion A2 is inserted from below into the outer supporting part or abutment element 16, snaps into place, in a detent-like manner, behind the upper, rounded-off edge 35 of the outer supporting part or abutment element 16 independently of the inner supporting part or abutment element 13 and is freely retained by the element 16 during assembly, i.e., with a still absent inner supporting part or abutment element 13, without being able to fall or slip through in the downward direction. A hollow space 36 renders possible a particularly free play of the auxiliary rubber cushion B2 and of the extension $a'_2$ of the main cushion A2.

While in the embodiments according to FIGURES 1a and 1b, the respective auxiliary rubber buffer or cushion B is arranged above the respective buffer or cushion part SA and abuts against an upper flanged wall portion 26 of the outer supporting part or abutment element 16, the auxiliary rubber buffers or cushions B3 and B4, respectively, of FIGURES 2a and 2b are arranged at least partially at the height of the respective buffer or cushion part SA3 or SA4 by being accommodated outwardly of the outer supporting part or abutment element 16' more or less within the outer annular space formed by the angular supporting part thereof.

In the embodiment of FIGURE 2a, the auxiliary rubber buffer or cushion B3 is supported by means of the lower end face 25 thereof against the end face 37 of the lower flanged wall portion 20' of the outer supporting part or abutment element 16' which serves simultaneously for the oppositely directed support of the lower buffer or cushion part AA3 by means of the upper end face 19 thereof.

In the embodiment according to FIGURE 2b, the support of the auxiliary rubber buffer or cushion B4 takes place by means of the lower end face 25 thereof against a separate angular supporting ring 38 which is slid, with the upwardly directed cylindrical wall portion 39 thereof, over the cylindrical wall portion 24 of the supporting or abutment element 16' which, in this case, has an angular cross section. The end position of part 38 may thereby be fixed by the angularly bent end 40 of the cylindrical wall portion 39; but parts 38 and 16' may also be welded to each other or otherwise be connected in any suitable conventional manner.

In the embodiment of FIGURES 2a and 2b, the screw or bolt 30' is threaded into a separate sleeve 41 which, in turn, is inserted into the upper aperture of the inner insert piece 13.

As is the case with the embodiments according to FIGURES 1a and 1b, the inner supporting part or abutment element 13' is conically shaped also in the embodiments of FIGURES 2a and 2b in the lower portion thereof at the height of the respective buffer or cushion part A; in that case, the inner supporting part or abutment element 16' is constructed integrally with the extension 10a'' of the axle bearer member 10. Hollow spaces 42 may additionally assure, in all cases, that the respective buffer or cushion part AA is not loaded or stressed by radial forces.

The connection between the vehicle superstructure 11 and the axle bearer member 10 by means of the rubber bearing in accordance with the present invention may be made in the following manner:

The main rubber buffers or cushions A are slipped from above upon the respective extensions 10a of the axle bearer member 10 and upon the respective inner supporting parts or abutment elements 13. Thereupon the vehicle superstructure 11 is placed upon the main rubber buffers or cushions A by means of the longitudinal bearer 11a thereof together with the respective outer supporting parts or abutment elements 16, whereby the supporting parts 16 slide over the conical surfaces 32 of the main rubber buffers or cushions A in the manner already described hereinabove, until they assume the position illustrated in the respective embodiments. Thereupon the respective auxiliary rubber buffers or cushions B are emplaced and the connection is secured by emplacement of the cover 29 and by axially screwing-on the central screw or bolt 30 or 30', respectively.

As already set forth hereinabove, the main buffers or cushions A may instead also be first connected with the outer supporting parts or abutment elements 16, i.e., with the vehicle superstructure, and only thereafter be placed upon the axle bearer member together with these parts.

As is apparent, the resulting support of the horizontal forces H takes place, in all cases, above the buffer or cushion part AA approximately at a point M, so that there will result a large distance e of the point M from the lower longitudinal support of the axle bearer by means of the longitudinal connecting or thrust rods 8.

Due to the particular construction of the rubber bearing, the rubber buffers or cushions thereof do not come into contact with any metal surfaces which are exposed to a particular danger of rusting because of the accumulation of rain and moisture. Any rain dropping from above into the cup-shaped part 14 is collected below the auxiliary rubber buffer or cushion B and may, if necessary, be drained off downwardly through individual bores 43.

While we have shown and described herein several embodiments in accordance with the present invention, it is understood that the same is not limited thereto, but is susceptible of many changes and modifications within the spirit and scope of the present invention and we, therefore, do not wish to be limited to the details described and shown herein, but intend to cover all such changes and modifications as are encompassed by the scope of the appended claims.

We claim:

1. A substantially annular-shaped elastic bearing for connecting with each other two vehicle parts, especially an axle bearer with the superstructure of a motor vehicle, by the interposition of an elastic cushion structure disposed between said two vehicle parts and operable to absorb axially directed forces as well as radially directed forces, said elastic cushion structure comprising first substantially sleeve-like elastic cushion means having abutment surfaces disposed radially mutually opposite each other and substantially parallelly to the axis of the annulus for absorbing the radially effective forces, second substantially annularly-shaped elastic cushion means having abutment surfaces disposed axially mutually opposite each other and substantially perpendicular to said axis for absorbing axially effective forces, third elastic cushion means having approximately radial abutment surfaces spaced in the axial direction for absorbing at least axially directed forces which are oppositely directed to the forces absorbed by said annularly-shaped elastic cushion means, and support means of angular cross section for absorbing the radially and axially directed forces of said cushion means including inner and outer supporting parts provided with approximately axially extending wall means engaging the abutment surfaces of said first elastic cushion means and with approximately radially extending flange means engaging the abutment surfaces of said second and third elastic cushion means, said first elastic cushion means being provided with a substantially conically shaped extension to facilitate insertion into the respective outer supporting part, said extension overlapping with an annularly shaped projection the last-mentioned outer supporting part in a detent-like manner to hold thereat said first elastic cushion means, said third elastic cushion means having lesser working capacity than said annularly-shaped elastic cushion means and both said annularly-shaped and said third elastic cushion means being arranged so as to be freely expandable at least in a radially outward direction thereof, said extension of said first elastic cushion means being disposed above said second elastic cushion means and approximately at the height of said third elastic cushion means.

2. A substantially annularly-shaped elastic bearing for connecting with each other two vehicle parts, especially an axle bearer with the superstructure of a motor vehicle, by the interposition of an elastic cushion structure disposed between said two vehicle parts and operable to absorb axially directed forces as well as radially directed forces, said elastic cushion structure comprising first substantially sleeve-like elastic cushion means having abutment surfaces disposed radially mutually opposite each other and substantially parallelly to the axis of the annulus for absorbing the radially effective forces, second substantially annularly-shaped elastic cushion means having abutment surfaces disposed axially mutually opposite each other and substantially perpendicularly to said axis for absorbing axially effective forces, third elastic cushion means having approximately radial abutment surfaces spaced in the axial direction for absorbing at least axially directed forces which are oppositely directed to the forces absorbed by said annularly-shaped elastic cushion means, and support means of angular cross section for absorbing the radially and axially directed forces of said cushion means including inner and outer supporting parts provided with approximately axially extending wall means engaging the abutment surfaces of said first elastic cushion means and with approximately radially extending flange means engaging the abutment surfaces of said second and third elastic cushion means, said first elastic cushion means being provided with a substantially conically shaped upper extension to facilitate insertion into the respective outer supporting part, said extension overlapping with an annularly shaped projection the last-mentioned outer supporting part in a detent-like manner to hold thereat said first elastic cushion means, said third elastic cushion means abutting directly against said extension, said third elastic cushion means having lesser working capacity than said annularly-shaped elastic cushion means and both said annularly-shaped and said third elastic cushion means being arranged so as to be freely expandable at least in the radially outward direction, said extension of said first elastic cushion means being disposed above said second elastic cushion means and approximately at the height of said third elastic cushion means.

3. A substantially annularly-shaped rubber bearing for connecting with each other two vehicle parts, especially an axle bearer with the superstructure of a motor vehicle, by the interposition of elastic cushion disposed between said two vehicle parts and operable to absorb axially directed forces as well as radially directed forces, comprising said cushion and support means therefor, said elastic cushion comprising main cushion means including a substantially sleeve-like elastic cushion part having abutment surface means disposed radially mutually opposite each other and substantially parallelly to the axis of the annulus for absorbing the radially effective forces and an annularly-shaped elastic cushion part having abutment surface means disposed axially mutually opposite each other and substantially perpendicularly to said axis for absorbing axially effective forces, said sleeve-like cushion part being disposed above said annularly-shaped cushion part and said sleeve-like cushion part being provided with a substantially conically-shaped upper extension to facilitate insertion into the respective support means, auxiliary cushion means including an auxiliary elastic cushion part for absorbing axially effective forces which are at least oppositely directed to the forces absorbed by said annularly-shaped elastic cushion part, said auxiliary elastic cushion part being disposed approximately at the height of said extension of said sleeve-like cushion part and including a substantially conical-shaped inner surface abutting said conically-shaped upper extension of said sleeve-like cushion part when said bearing is assembled, said support means including a single axial threaded member for holding together said elastic bearing.

4. A substantially annularly-shaped elastic bearing for connecting with each other two vehicle parts, especially an axle bearer with the superstructure of a motor vehicle, by the interposition of an elastic cushion structure disposed between said two vehicle parts and operable to absorb axially directed forces as well as radially directed forces, said elastic cushion structure comprising a first substantially sleeve-like elastic cushion means having abutment surfaces disposed radially mutually opposite each other and substantially parallelly to the axis of the annulus for absorbing the radially effective forces, a second substantially annularly-shaped elastic cushion means having abutment surfaces disposed axially mutually opposite each other and substantially perpendicularly to said axis for absorbing axially effective forces, a third elastic cushion means separate from said first and second elastic cushion means having approximately radial abutment surfaces spaced in the axial direction for absorbing at least axially directed forces which are oppositely directed to the forces absorbed by said annularly-shaped elastic cushion means and support means of angular cross section for absorbing the radially and axially directed forces of said cushion means including inner and outer supporting parts provided with approximately axially extending wall means engaging the abutment surfaces of said first elastic cushion means and with approximately radially extending flange means engaging the abutment surfaces of said second and third elastic cushion means, said first elastic cushion means being provided with a substantially conically shaped upper extension to facilitate insertion into the respective outer supporting part, said outer supporting part including a first supporting element of angular cross section mounted over a second supporting element of angular cross section, said first supporting element engaging at least some of the abutment surfaces of said third elastic cushion means and said second supporting element engaging at least some of the abutment surfaces of said first and second elastic cushion means.

References Cited in the file of this patent

UNITED STATES PATENTS

| 1,738,532 | Harbour | Dec. 10, 1929 |
| 1,805,175 | Hanak | May 12, 1931 |
| 2,538,954 | Efromson et al. | Jan. 23, 1951 |
| 2,638,303 | Pietz | May 12, 1953 |

FOREIGN PATENTS

| 140,864 | Australia | Sept. 18, 1947 |
| 589,383 | Canada | June 19, 1947 |